US009826714B2

(12) United States Patent
Garrity (10) Patent No.: US 9,826,714 B2
(45) Date of Patent: Nov. 28, 2017

(54) TRACKING SENSOR (71) Applicant: Garrity Power Services LLC, Rockwall, TX (US)

(72) Inventor: Paul Garrity, Rockwall, TX (US)

(73) Assignee: Garrity Power Services LLC, Rockwall, TX (US)

( * ) Notice: Subject to any disclaimer, the term of this patent is extended or adjusted under 35 U.S.C. 154(b) by 0 days.

(21) Appl. No.: 15/234,809

(22) Filed: Aug. 11, 2016

(65) Prior Publication Data

US 2017/0042119 A1    Feb. 16, 2017

Related U.S. Application Data

(60) Provisional application No. 62/204,770, filed on Aug. 13, 2015.

(51) Int. Cl.
*A01K 11/00* (2006.01)
*G06K 7/10* (2006.01)
*G01S 5/02* (2010.01)

(52) U.S. Cl.
CPC .......... *A01K 11/008* (2013.01); *A01K 11/004* (2013.01); *G01S 5/0226* (2013.01); *G01S 5/0294* (2013.01); *G06K 7/10366* (2013.01)

(58) Field of Classification Search
CPC . A01K 11/004; A01K 11/008; H04Q 2209/47
See application file for complete search history.

(56) References Cited

U.S. PATENT DOCUMENTS

| 2004/0017313 | A1 | 1/2004 | Menache |
| 2006/0056370 | A1 | 3/2006 | Hancock et al. |
| 2010/0214068 | A1 | 8/2010 | Nadkarni |
| 2010/0302004 | A1 | 12/2010 | Winstead et al. |
| 2011/0181399 | A1 | 7/2011 | Pollak et al. |
| 2012/0201277 | A1 | 8/2012 | Tanner et al. |
| 2013/0340305 | A1 | 12/2013 | Mobley |
| 2014/0333439 | A1* | 11/2014 | Downing ............. A01K 29/005 340/573.3 |

* cited by examiner

*Primary Examiner* — Curtis Odom
(74) *Attorney, Agent, or Firm* — Hovey Williams LLP (57) ABSTRACT

Tracking tags for attachment to an object or animal. The tracking tags may include low-power long-range transmitters drawing power from a battery or a renewable energy source. The tracking tags may also each include a microcontroller having a sleep-mode module enabling nearly no quiescent current to be drawn when the microcontroller is in a sleep-mode. The microcontroller may enter into a sleep-mode for long periods of time following a short period of sending data to the low-power long-range transmitter. The short period of sending data may be approximately one-twentieth of the long sleep-mode period. The tracking tags may also include sensors for determining an ambient temperature or biometric data about an animal to which the tracking tag is attached. Locations of the tracking tags may be determined using signal trilateration and/or signal triangulation.

20 Claims, 9 Drawing Sheets

TRACKING SENSOR

RELATED APPLICATIONS

This patent application claims priority benefit to a provisional patent application titled "Cattle Tracking Sensor" U.S. Application No. 62/204,770, filed Aug. 13, 2015, incorporated by reference herein in its entirety.

TECHNICAL FIELD

The present invention is directed, in general, to tracking sensors and, more specifically, to an apparatus to provide a tracking sensor for cattle.

BACKGROUND

Cattle tracking has traditionally been done by tagging cattle with a visual indicator showing a number. This visual indicator was previously done by branding but is more commonly done now with ear tags. Visual indicators require substantial time and effort on the part of owners to track large number of cattle.

In the past decade, passive Radio Frequency Identification (RFID) began to be used in tagging cattle. Passive RFID involves sending small amounts of energy and signals to a device in close proximity to the transmitter. The transmitted energy provides enough power for the RFID tag to process information and to send back a signal to the transmitter, thus providing an identification of the device that contains the RFID tag. The use of RFID in cattle tracking requires that the cattle come very close to (within a few meters of) the transmitter. Passive RFID tags are only powered when in close proximity to the transmitter (which occurs only a small fraction of each day), so these tags are unable to collect any information about the animal.

Active RFID tags must be powered by a power source such as a battery. Active RFID tags are capable of collecting information and relaying that information back to the transmitter. However, the drain on the battery presents problems with need to frequently replace the batteries in the field. Furthermore, the power level achieved by a small battery inside an ear tag would be inadequate to transmit standard RF signals over any appreciable distance. Thus, active RFID tags suffer from the same deficiencies as passive RFID tags, except that they are capable of collecting information about the animal even when not in range of the transmitter.

SUMMARY OF THE INVENTION

The present invention solves the above-described problems and provides a distinct advance in the art of cattle tracking. Specifically, the present invention includes a tracking tag, such as an ear tag for cattle, which comprises a renewable power source, a microcontroller, and a low-power long-range transmitter or transceiver than can transmit signals over long distance, and which draws nearly no quiescent current when it is not transmitting or receiving information. This tracking tag obviates the need for bringing a transmitter near the animal or getting all of the animals to come near a transmitter, due to its ability to transmit over very long distances. The tracking tag also allows an owner to track a large number of animals including knowing their position and obtaining real-time health information about the animal. The low-power long-range transmitter or transceiver allows for the use of a small renewable power source that does not cause discomfort to the animal when used as an ear tag and does not require frequent replacement.

In cases where the transmitter or transceiver's overall power level is kept adequately low, it is also possible to deploy the tracking tag without a renewable energy source, allowing a 1 year battery life with reasonably light weight. Such a tracking tag provides substantial benefits not only for livestock tracking, but for many other industries as well. For example, any industry requiring storage of items would benefit from the ability to locate those items through an active tracking system as described herein.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF ILLUSTRATIVE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
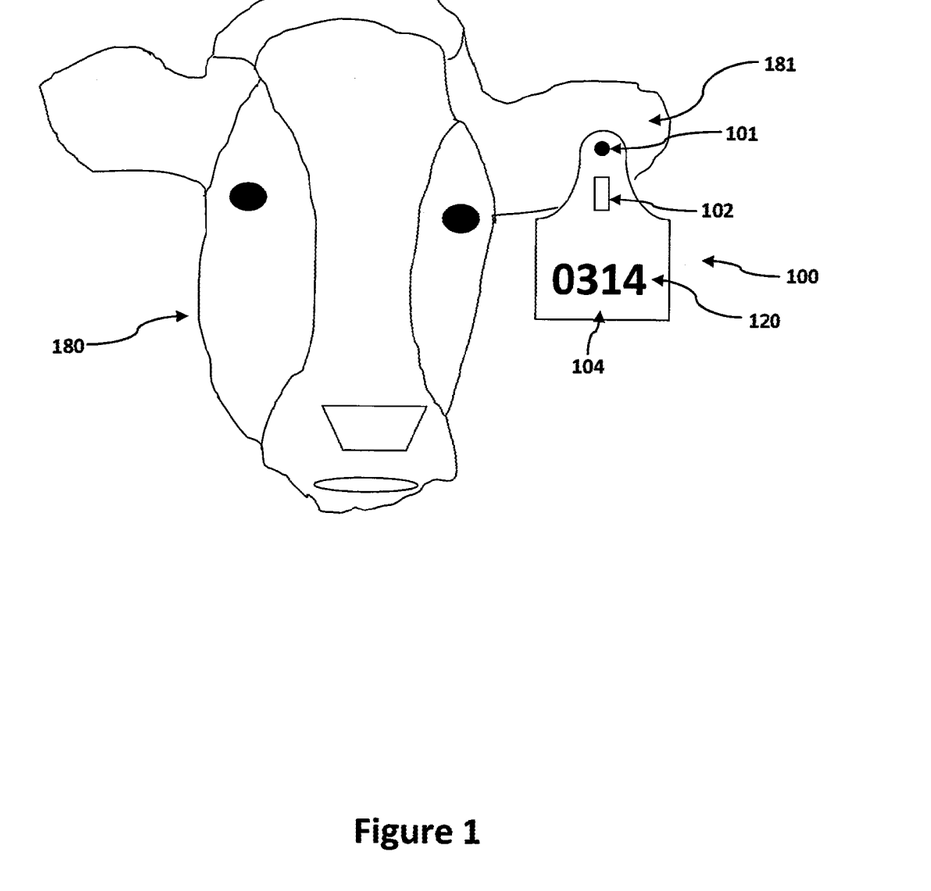
FIG. 1 is a front elevation view of a cow's head with a tracking tag, constructed in accordance with various embodiments of the present invention, fixed to the cow's ear.
Figure 2:
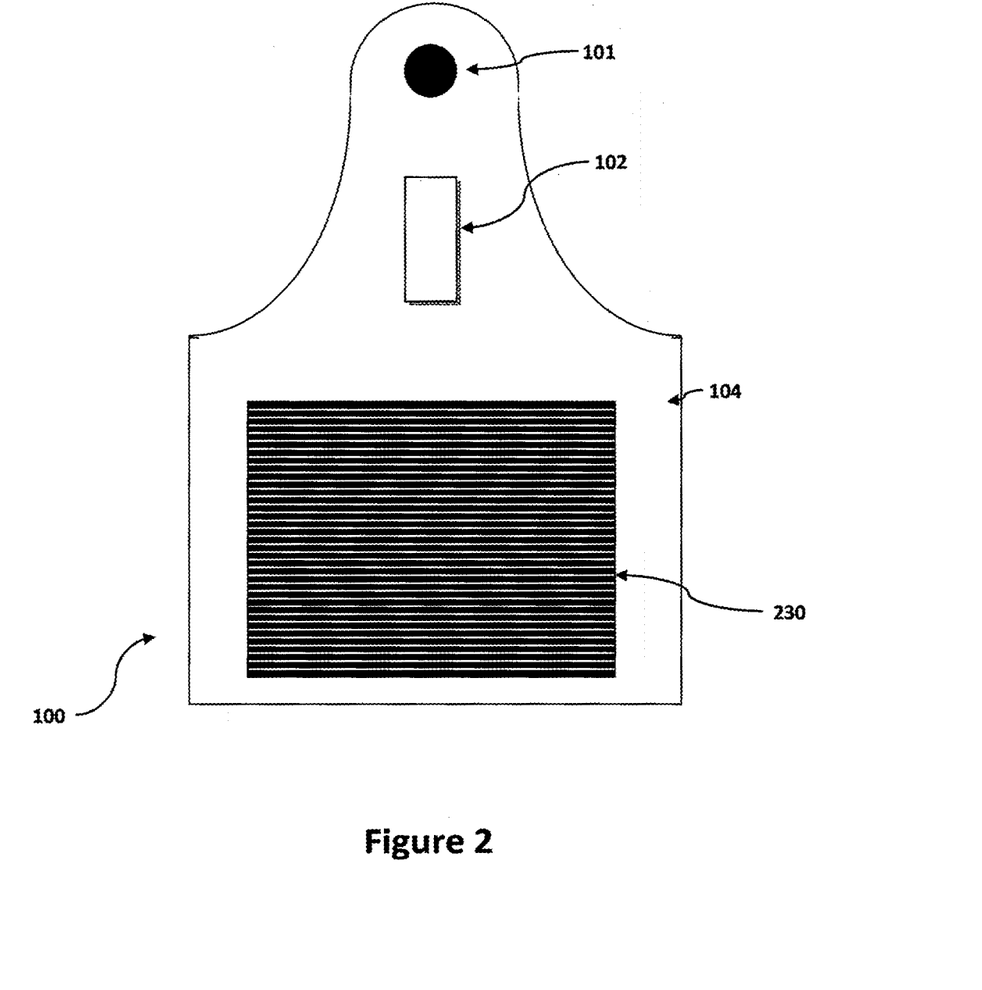
FIG. 2 is a front elevation view of the tracking tag of FIG. 1.
Figure 3:
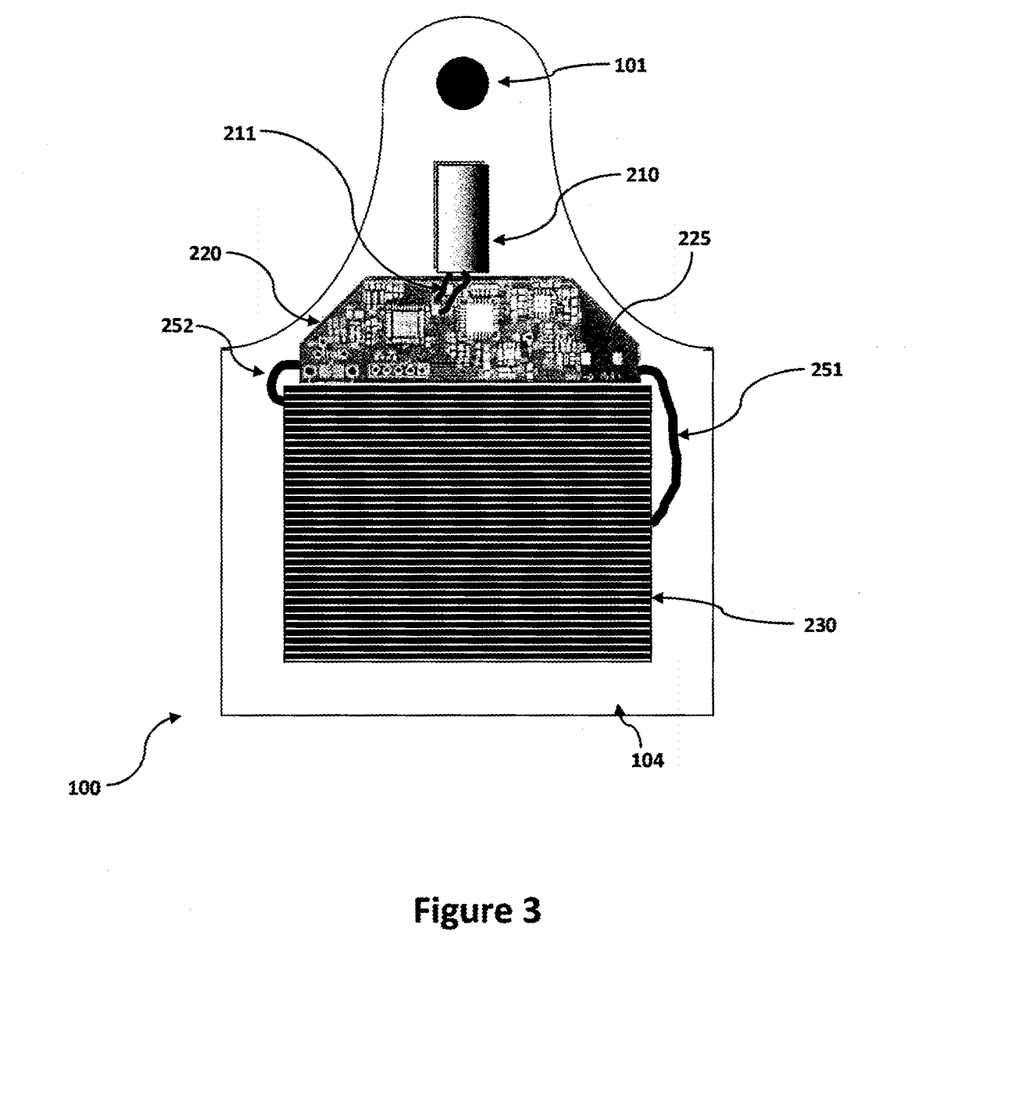
FIG. 3 is a front elevation view of the tracking tag of FIG. 1 with a cover of the tracking tag removed to illustrate a circuit board thereof.

An embodiment of a tracking tag is illustrated in FIGS. 1, 2, and 3. FIG. 1 illustrates a front face of an embodiment of a tracking tag attached to an animal that is to be tracked. FIG. 2 illustrates a back face of the tracking tag illustrated in FIG. 1. FIG. 3 illustrates an inside of the back face of the tracking tag illustrated in FIG. 1.

Referring to FIG. 1, a tracking tag 100 is configured as an ear tag for an animal 180. The tracking tag 100 comprises a tag body 104 or enclosure having an ear attachment hole 101 formed therethrough, a battery compartment 102 formed on or in the tag body 104, and visual identification information 120 printed, engraved, adhered to, or otherwise presented on a surface of the tag body 104 or any other exposed surface of the tracking tag 100.

The tag body 104 may have a front face and a back face opposite the front face. The front face of the tag body 104 may look similar to a standard ear tag identifier for an animal, other than the protrusion of the battery compartment 102. The ear attachment hole 101 may be configured to receive a pin (not shown) to attach the tracking tag 100 to the ear of an animal. The battery compartment 102 may hold a small battery (not visible in FIG. 1). The visual identification information 120 allows someone nearby the tracking tag 100 to identify an animal in a traditional visual manner. As noted above, FIG. 2 illustrates the back face of the tracking tag 100. Visible in FIG. 2 are the protrusion of the battery compartment 102 and a visible portion of a photovoltaic panel 230, as described below.

FIG. 3 illustrates the same side of the tracking tag 100 illustrated in FIG. 2, except that a cover or portion of the tag body 104 is removed and various components of the tracking tag 100 are visible. A battery 210 resides in the battery compartment 102. Battery 210 is coupled to a circuit board 220 through wires 211. The circuit board 220 comprises a location 225 for an antenna. The circuit board 220 is further coupled to the photovoltaic panel 230. The cover to the back face of the tag body 104 may present an opening in the area of the photovoltaic panel 230 so that the photovoltaic panel 230 is exposed to light whether or not the back cover of the tag body 104 is in place.

Figure 4:
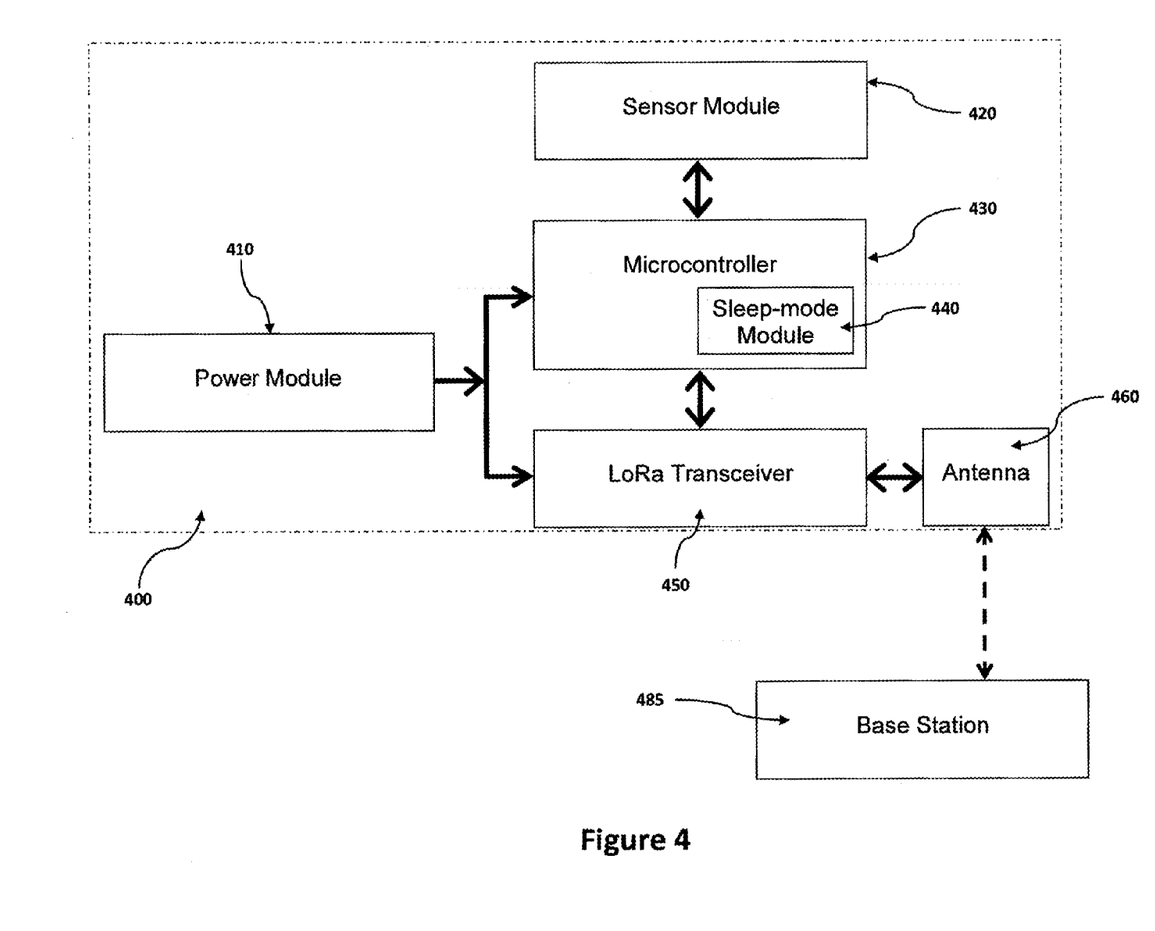
FIG. 4 is a block diagram of electrically coupled components of the tracking tag of FIG. 1.

FIG. 4 illustrates a simplified block diagram of the tracking tag 100. A power module 410 comprises an energy storage element and provides power to a microcontroller 430 and a long-range transceiver 450. A sensor module 420 is powered from the microcontroller 430 rather than directly from the power module 410, thereby allowing the microcontroller 430 to shut down the sensor module 420 to conserve power.

The sensor module 420 provides information to the microcontroller 430. The sensor module 420 may comprise an ambient temperature monitor. The sensor module 420 may also comprise an ear canal temperature sensor for the animal, or other components to monitor heart rate, blood pressure, or other animal vital signs. The information provided to the microcontroller 430 from the sensor module 420 may be done with a continuous analog signal (such as a thermistor), or it may be done with a digital module (e.g. digital temperature module) that communicates digitally with the microcontroller 430.

The microcontroller 430 may include any computer components, processors, or microprocessors known in the art and may further include any number and combination of controllers, circuits, integrated circuits, programmable logic devices such as programmable logic controllers (PLC), and/or other data and signal processing devices for carrying out the functions described herein, and may additionally comprise one or more memory storage devices. Furthermore, the microcontroller 430 may be configured to execute any steps, algorithms, subroutines, or codes described herein. The microcontroller 430 and computer programs described herein are merely examples of computer equipment and programs that may be used to implement the present invention and may be replaced with or supplemented with other computers, processors, and/or computer programs without departing from the scope of the present invention. While certain features are described as residing in the microcontroller 430 or control systems associated therewith, the invention is not so limited, and those features may be implemented elsewhere. For example, the associated memory storage devices may alternatively be located remotely from the microcontroller 430 and wirelessly accessible by the microcontroller 430 without departing from the scope of the invention.

In various embodiments of the invention, the microcontroller 430 may implement a computer program and/or code segments to perform some of the functions described herein. The computer program may comprise an ordered listing of executable instructions for implementing logical functions in the processor. For example, the computer program may be a software program configured to run on a computer, such as a personal computer, laptop, tablet, or the like. The computer program can be embodied in any computer-readable medium for use by or in connection with an instruction execution system, apparatus, or device, and execute the instructions. In the context of this application, a "computer-readable medium" can be any physical means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

The memory storage devices may be integral with the microcontroller 430, stand-alone memory, or a combination of both. The memory storage devices may include, for example, removable and non-removable memory elements such as RAM, ROM, flash, magnetic, optical, USB memory devices, MMC cards, RS MMC cards, SD cards such as microSD or miniSD, SIM cards, and/or other memory elements. Specifically, the memory storage devices may store at least a portion of the computer program or code segments described above, firmware code, software code, and any data sensed by the sensor module 420.

The microcontroller 430 is programmed or otherwise configured to provide power to the sensor module 420 only when it needs to receive a reading. When the microcontroller 430 is asleep, the sensor module 420 does not receive any power. Due to a short settling time of the analog-to-digital converter on the microcontroller 430, the microcontroller 430 will typically need to power up the sensor module 420 for a short time preceding taking a reading, such as 10 microseconds or 1 to 20 microseconds depending on the application. In cases where sensor module 420 comprises a digital sensor, the microcontroller 430 may need to power up the sensor module 420 for a longer period of time preceding a reading, such as 100 microseconds to 1 millisecond.

The microcontroller 430 communicates with the long-range transceiver 450 and the long-range transceiver 450 communicates with a base station 485 via an antenna 460. The base station 485 may also have a long-range transceiver (not shown) substantially identical to the long-range transceiver 450 described herein, configured for receiving signals from the long-range transceiver 450. The base station 485 may be configured to communicate with the tracking tag 100 or a plurality of tracking tags and to display, store, and/or process data communicated therewith from the tracking tags. Thus the base station may include processors, memory storage devices, display screens, user interfaces, and any computing hardware components known in the art.

The microcontroller 430 further comprises a sleep-mode module 440. The sleep-mode module 440 enables the microcontroller 430 to enter a low-power mode which draws nearly no quiescent current from the power module 410. For example, in sleep-mode, the micro-controller may draw less than 10 microamps or, in some embodiments of the invention, less than 1 microamp. Sleep-mode typically enables the quiescent current draw from the power module to be nearly 0 by shutting down all unused functional blocks of the microcontroller. For example, all of the microcontroller functional blocks may be shut down other than a single functional block required to operate a timer that determines when to bring the microcontroller out of sleep-mode. The sleep-mode module 440 is programmed to cause the microcontroller 430 to enter a low-power sleep mode for a relatively long period of time (such as 10 minutes) compared to the time required to wake up and transmit a packet of information (such as 1 second). In some embodiments of the invention, the long period of time may be in a range of 1 minute to 24 hours and the time required to wake up and transmit a packet of information may be in a range of 100 microseconds to 10 seconds. The microcontroller 430 can also cause the long-range transceiver 450 to enter a low-power sleep mode or to remove power from it completely to conserve power when the microcontroller 430 is in sleep mode.

The long-range transceiver 450 may be any transceiver or transmitter configured similar or identical to the transceivers or transmitters described in U.S. Pat. No. 7,791,415, incorporated by reference in its entirety herein. For example, the long-range transceiver 450 may be a LoRa™ transceiver including LoRa™ wireless RF technology by Semtech Corporation of Camarillo, Calif. Specifically, the long-range transceiver 450 may use the LoRa™ or long-range technology as described in U.S. Pat. No. 7,791,415 to allow low-power transmission over long distances such as 1 kilometer. In some embodiments of the invention, the long-range transceiver 450 may allow low-power transmission over distances in a range of 100 meters to 10 kilometers.

Figure 5:
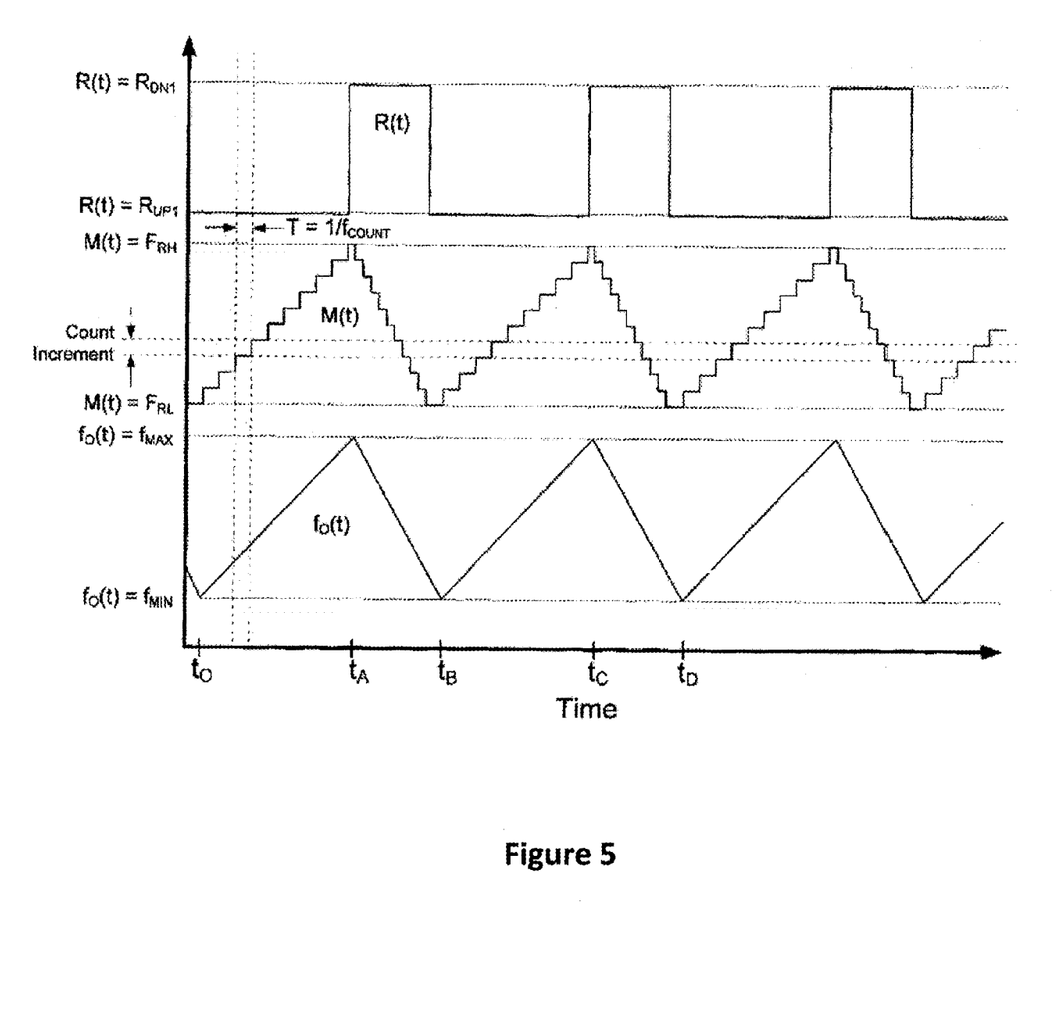
FIG. 5 is a graph illustrating an example frequency modulation scheme used in a long range transmitter or transceiver.

Standard transmission technologies generally use frequency-shift keying to transmit digital bits of information—that is, a transmission frequency is modulated into a single upper frequency or a single lower frequency to represent a binary 0 or 1 to be decoded by a receiver. In contrast, LoRa™ or long-range technology uses a fractional-N phase-locked-loop to allow a modulated frequency that differs in up-frequency rate from down-frequency rate with great accuracy. FIG. 5 illustrates typical waveforms for a long-range transceiver or transmitter. The top plot in FIG. 5 shows a binary waveform representing a binary 0 or a binary 1, corresponding to the desired bit to be transmitted, in which a binary 0 corresponds to a frequency up-rate and a binary 1 corresponds to a frequency down-rate. The center waveform in FIG. 5 corresponds to a digital multiplier inside the fractional-N phase-locked loop of the long-range transceiver 450. The bottom plot in FIG. 5 corresponds to the frequency produced by the long-range transceiver 450 as a result of the changing digital multiplier. The frequency shown in the bottom plot of FIG. 5 is a smoothed version of the stair-step waveform of the middle plot of FIG. 5. Smoothing occurs due to a randomization of frequency at a frequency substantially higher than the low-pass filter of the phase-locked loop in the long-range transceiver 450.

The base station's long-range transceiver determines whether the transmission frequency is increasing or decreasing corresponding to a respective assignment of a binary 0 or 1 to the transmission string. Measurement of frequency ramp direction (LoRa™ or long-range technology described herein) as opposed to measurement of frequency change (other standard technologies) allows resolution of signals with much lower power levels. Use of LoRa™ or long-range technology can increase signal resolution by approximately 30 dB. This increase in signal resolution and associated decrease in required signal power enables use of a small power module 410 which has a weight small enough to be used in an ear tag that is not too heavy for use with an animal. Furthermore, the increase in signal resolution allows transmission over long distances (such as 1 kilometer) when coupled with an adequately low-weight power module, thus enabling the tracking tag 400 to transmit information to a base station 485 which is far enough away to be used in most typical grazing scenarios for the animals that are wearing the tracking tags.

LoRa™ or long-range technology also conserves power when not transmitting. Quiescent current when not transmitting is typically on the order of 10 microamperes or less for a long-range transceiver or transmitter. The low quiescent current of the long-range transceiver enables use of low-energy storage power sources.

Figure 6:
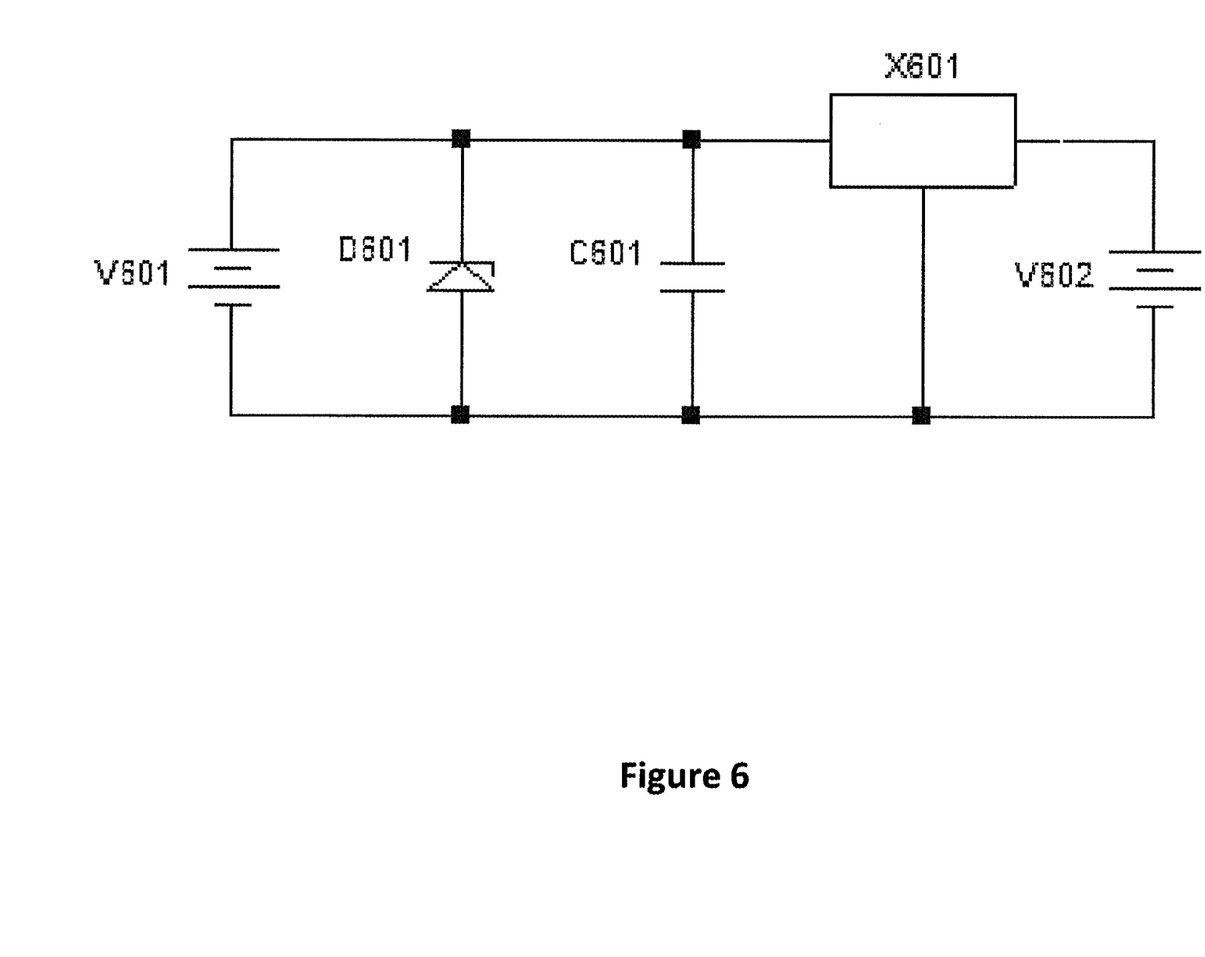
FIG. 6 is a simplified schematic of an embodiment of a power module in the tracking tag of FIG. 1.
Figure 7:
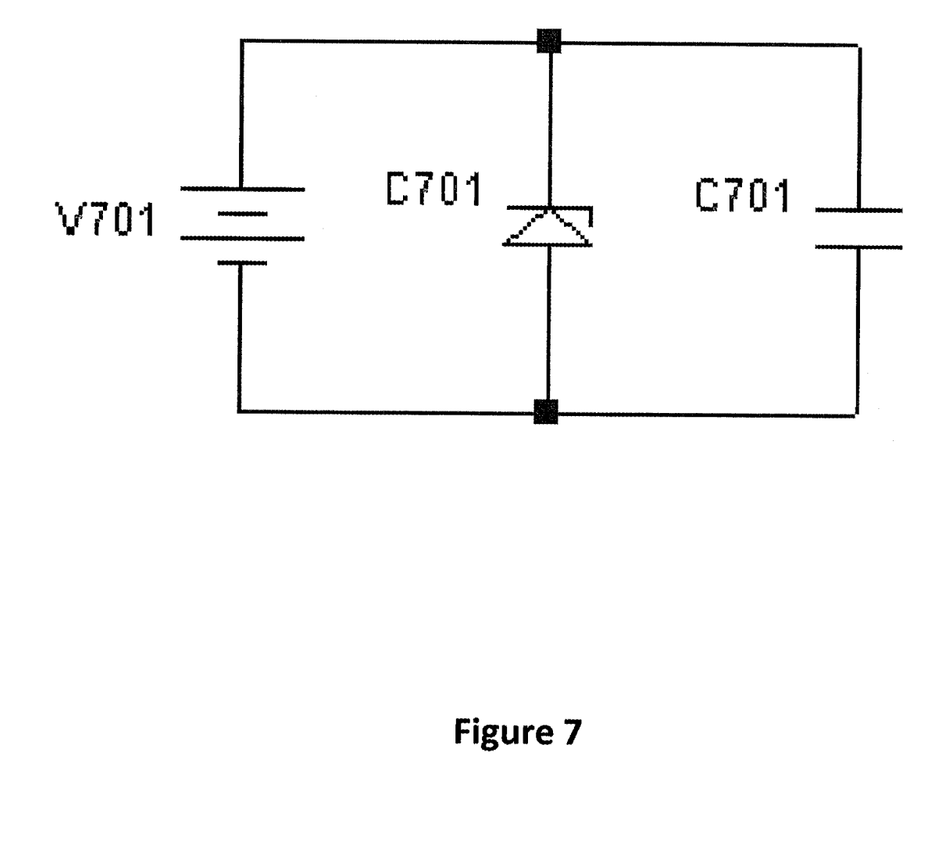
FIG. 7 is a simplified schematic of an alternative embodiment of the tracking tag's power module.

Various embodiments of the invention are feasible to use for the power module 410 in FIG. 4. Two such power module embodiments are shown in FIGS. 6 and 7. However, other embodiments of the power module may be used without departing from the scope of the invention.

FIG. 6 illustrates one embodiment of a power module. The power module embodiment illustrated in FIG. 6 comprises an energy storage element lithium-ion battery V602 as well as an energy generation element photovoltaic panel V601. The photovoltaic panel V601 is in parallel with a voltage clamp D601. The voltage clamp D601 could for example be a Zener diode or a tranzorb with voltage breakdown higher than the expected peak voltage of the photovoltaic panel V601. The voltage clamp D601 functions to limit peak voltages in the power module that could occur from either low temperatures (that cause increased voltage across V601) or transients that could enter the photovoltaic panel V601. C601 is a small capacitor such as an electrolytic capacitor of approximately 1 to 10 microFarads. V602 is a lithium-ion battery. Due to the use of LoRa™ or long-range technology, the lithium-ion battery V602 can be very small and have a weight of approximately 1 ounce. X601 is a lithium-ion battery charger that regulates the voltage from C601 to the appropriate voltage for charging the lithium-ion battery V602. The voltage across V602 is the output power from the power module.

FIG. 7 illustrates another embodiment of a power module that comprises an energy storage element super capacitor C701 as well as an energy generation element photovoltaic panel V701. For the embodiment in FIG. 7, a photovoltaic panel V701 is in parallel with a voltage clamp D701. C701 in FIG. 7 is a super capacitor, sometimes referred to as an electric double-layer capacitor. Super capacitors are compact, high-capacitance capacitors. For example, a super capacitor in this application might have a rating of 1 Farad and 5.5V and be less than 25 millimeters in diameter and less than 8 millimeters thick. The voltage clamp D701 may be sized to protect the super capacitor. So if the super capacitor C701 is rated for 5.5V, D701 may be sized to prevent the voltage across C701 from exceeding 5V. The photovoltaic panel V701 would thus be clamped at a maximum voltage of 5V and would naturally charge the super capacitor C701 with current that is naturally limited by the photovoltaic panel until the super capacitor obtains a peak voltage of 5V. The power module in FIG. 7 thus provides a low-cost simple method of attaining a regulated power supply that also has a reasonable hold-up time when the photovoltaic panel V701 is shaded (or at night) due to the large capacitance of the super capacitor C701 and the low average current drawn by the long-range transceiver or transmitter.

Figure 8:
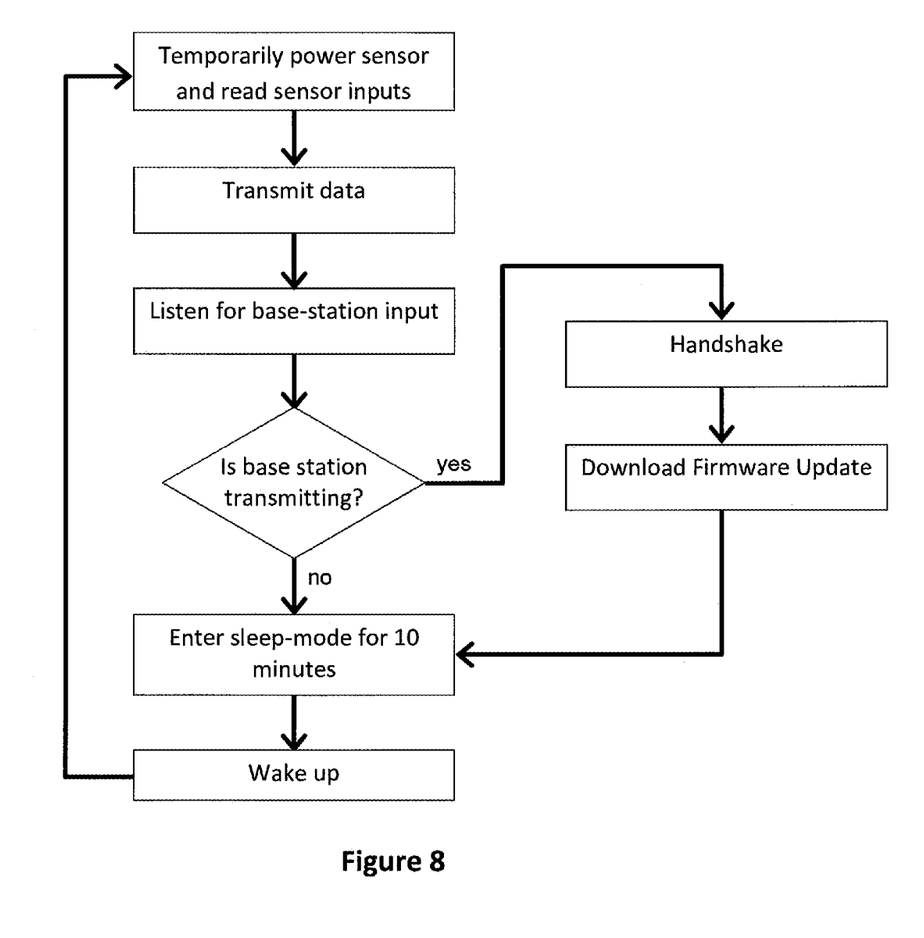
FIG. 8 is a block diagram of a control technique for the tracking tag of FIG. 1.

FIG. 8 illustrates the sequence of control for the microcontroller 430 in an embodiment of the tracking tag 100. The microcontroller 430 temporarily powers and then reads inputs from the sensor module 420, after which the sensor module 420 is powered down. The microcontroller 430 then transmits the data to a base station, such as the base station 485. After transmitting data, the microcontroller 430 listens for a transmission from the base station 485 indicating that a firmware update needs to occur. In some embodiments of the invention, it is very rare for a firmware update to be required, and this feature is not necessary in some embodiments of the invention, though most applications will benefit from the ability to update the sleep-mode time that is programmed into the microcontroller's non-volatile memory.

In the event that the base station 485 is transmitting a signal requiring a firmware update, then the microcontroller may provide a handshake with the base station 485 and then may stay awake (i.e., not in sleep mode) to download a firmware update. As is known in the art, a "handshake" as referenced herein may be an automated process of negotiation that dynamically sets parameters of a communications channel established between two entities before normal communication over the channel begins. If the base station 485 is not transmitting a signal requiring a firmware update, (or if a firmware update has just been completed) then the microcontroller 430 may enter a sleep mode, typically on the order of 10 minutes, though this number may vary depending on the requirements of the application. Requirements may vary with power availability (such as due to sunlight in the area if the power module 410 employs a photovoltaic panel). Typical values of sleep-mode time may vary from 1 minute to 1 hour. Sleep-mode time might also change with time-of-day, for example by increasing the sleep-mode time at night when the animal is resting. When the sleep-mode time has lapsed, the microcontroller 430 will wake up, thus beginning to draw more power, and will repeat the cycle illustrated in FIG. 8.

In some embodiments of the invention, the average time the microcontroller 430 remains on may be very low, on the order of 0.1% to 1% of the time. When the microcontroller 430 is in sleep-mode, the sensor module 420 may also not be powered. The low duty cycle operation of the system, coupled with the low quiescent current drawn during sleep-mode, and the low power levels required for the long-range transceiver 450 enable the tracking sensor to function with small, low-weight power module components comprising, for example, a photovoltaic panel, a lithium-ion battery, and/or a super capacitor.

Figure 9:
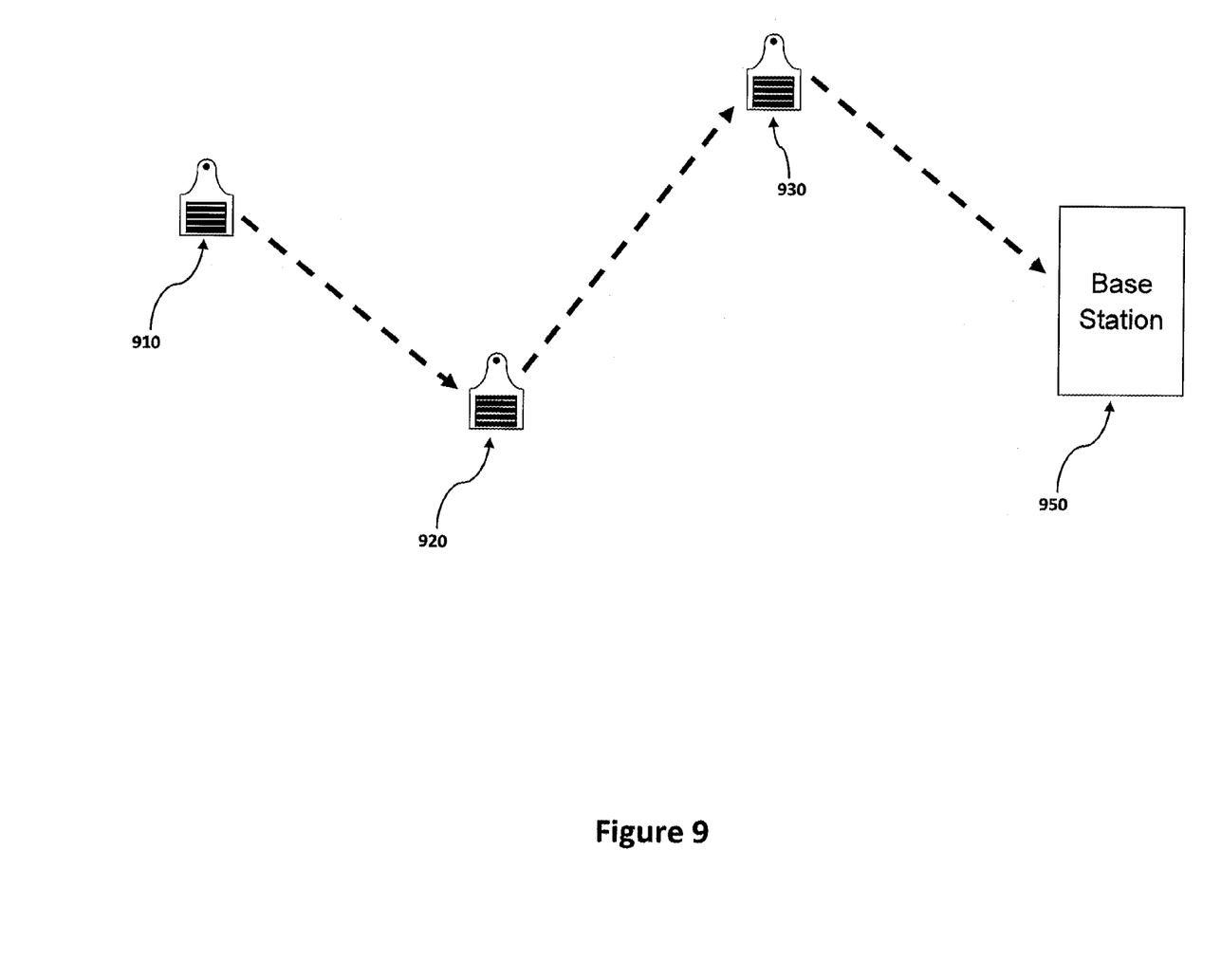
FIG. 9 is a schematic diagram of the use of mesh transmission in a tracking tag system constructed in accordance with various embodiments of the present invention.

An embodiment of the tracking tag 100 may also benefit from mesh transmission. In mesh transmission, each transmitter or transceiver listens for signals of surrounding transmitters or transceivers and retransmits those signals. FIG. 9 shows an example of mesh transmission. A first tracking tag 910 transmits information which is recorded by a second tracking tag 920. The second tracking tag 920 then retransmits data from the first tracking tag 910 as well as the data from the second tracking tag 920. A third tracking tag 930 records data from the first tracking tag 910 and the second tracking tag 920 which is being transmitted by the second tracking tag 920. The third tracking tag 930 then transmits data from first, second, and third tracking tags 910, 920, and 930 to a base station 950. The advantage of mesh transmission is that it allows reception of data from transmitters or transceivers that are out of range from the base station 950. The disadvantage is that it requires longer transmission times as well as coordination of transmission hops—that is, each tracking tag's microcontroller must be awake at the same time that a nearby transmitter or transceiver is transmitting data. Coordination can be accomplished through synchronization signals from the base station 950 and from each of the tracking tags 910, 920, 930. Some applications will benefit from additional redundancy and transmission distance afforded by a mesh while other applications will benefit from the lower duty cycles and transmission times required without a mesh.

Just as each tracking tag can be designed to receive and transmit data as part of a mesh, similarly, each tracking tag can function as a low-power base station due to the fact that each one can both transmit and receive data from other tracking tags. If a tracking tag is manufactured in high volume, one can therefore use a tracking tag configured to be a low-power and low-cost base station. For example, a microcontroller inside a tracking tag could be connected to a computer and/or user interface through a serial or other communication line, and the complexities of the long-range or LoRa™ communication described herein may be handled by the low-cost tracking tag, thus serving as a base station.

The tracking tags can also be used to locate a sensor through commonly known means such as signal trilateration, and/or signal triangulation. Signal trilateration involves using an array of sensors to determine distance of a tracking tag from two or more base stations, and using that distance information to locate a tracking tag. Signal triangulation involves using timing to an array of antennas to determine direction of a tracking tag and using angles between two or more base stations, to locate a tracking tag.

Other effective alternatives will occur to a person skilled in the art. For example, the power module 410 could employ a self-winding mechanism instead of a photovoltaic panel. Some applications could benefit from use of battery without any charging source (e.g. photovoltaic panel) since the low-power, long-range enabled by LoRa™ or long-range technology could enable a 1-year battery life without any external charging source. Furthermore, the embodiments described herein may apply as well to tracking tags in applications other than an ear tag for an animal, such as tracking tags for items in a stock room. The ability of a tracking tag to prove the presence of an animal or object as well as its location means that the tracking tag will be useful even in applications without a sensor module. Those skilled in the art should understand that the previously described embodiments of the tracking tag and related methods of operating the same are submitted for illustrative purposes only.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Having thus described one or more embodiments of the invention, what is claimed as new and desired to be protected by Letters Patent includes the following:

What is claimed:

1. A tracking tag configured to be attached to an object or animal, such tracking tag comprising:
   a power module that comprises an energy storage element;
   a low-power long-range transmitter which consumes nearly no quiescent current when it is not transmitting or receiving information;
   a microcontroller comprising a sleep-mode module which allows nearly no quiescent current to be drawn when the microcontroller is in a sleep-mode, said microcontroller configured to communicate with said low-power long-range transmitter, said microcontroller further configured to enter into the sleep-mode for a long period of time following a short period of time sending data to the low-power long-range transmitter, wherein said short period of sending data is equal to or less than one-twentieth of said long period of time.

2. The tracking tag of claim 1, wherein the power module further comprises a renewable energy source.

3. The tracking tag of claim 1, wherein the energy storage element is a battery.

4. The tracking tag of claim 1, wherein the energy storage element is a super capacitor.

5. The tracking tag of claim 2, wherein the renewable energy source is a photovoltaic panel.

6. The tracking tag of claim 2, wherein the tracking tag is configured to be attached to an animal and the renewable energy source is a self-winding mechanism driven by movements of the animal.

7. The tracking tag of claim 1, wherein the low-power long-range transmitter comprises a fractional-N phase-locked loop transceiver.

8. The tracking tag of claim 1, further comprising a tag body to which or in which the power module, the low-power low-range transmitter, and the microcontroller are attached, wherein the tag body is attachable to an animal and comprising a visible identification code.

9. The tracking tag of claim 1, further comprising a sense module that comprises a sensor such that the sensor is not powered when the microcontroller is in the sleep mode.

10. The tracking tag of claim 9, wherein the sensor is configured to sense ambient temperature.

11. The tracking tag of claim 9, wherein the sensor is configured to sense temperature of an animal to which the tracking tag is attached.

12. The tracking tag of claim 9, wherein the sensor is configured to sense heart rate or blood pressure of an animal to which the tracking tag is attached.

13. The tracking tag of claim 1, wherein the tracking tag is configured for operating as a low power base station by receiving data from and transmitting data to other tracking tags.

14. A system comprising:
    a first tracking tag configured to be attached to an object or animal, such tracking tag comprising:
    a power module that comprises an energy storage element,
    a low-power long-range transmitter which consumes nearly no quiescent current when it is not transmitting or receiving information, and
    a microcontroller comprising a sleep-mode module which allows nearly no quiescent current to be drawn when the microcontroller is in a sleep-mode, said microcontroller configured to communicate with said low-power long-range transmitter, said microcontroller further configured to enter into the sleep-mode for a long period of time following a short period of time sending data to the low-power long-range transmitter, wherein said short period of sending data is equal to or less than one-twentieth of said long period of time; and
    a first base station configured for communicating with said first tracking tag.

15. The system described in claim 14, wherein the first base station is configured to determine an identification number of the first tracking tag.

16. The system described in claim 14, wherein the first base station is configured to determine a distance or angle of the first tracking tag from the first base station.

17. The system described in claim 14, wherein the system comprises a second base station, wherein the first and second base stations are configured to determine a location of said first tracking tag using triangulation or trilateration.

18. The system described in claim 14, wherein the first tracking tag is configured to receive firmware upgrades and the first base station is configured to upload new firmware to the tracking tag.

19. The system described in claim 14, further comprising a second tracking tag in which both the first and second tracking tags are configured to communicate with each other via a firmware mesh to enable transmission hops through one another.

20. A system comprising: a livestock tag; and a base station, said livestock tag comprising: a long-range transmission system that is configured to draw less than 10 microamperes quiescent current, a lithium ion battery, and a photovoltaic cell, said livestock tag further comprising an enclosure housing the long-range transmission system, the lithium ion battery, and the photovoltaic cell, wherein the enclosure emulates the size and shape of a standard cattle ear tag, wherein said livestock tag is further configured to communicate with the base station at distances of 100 meters to 10 kilometers, wherein the long-range transmission system is further configured to enter low-power sleep mode for more than 95% of the time, said sleep-mode corresponding to periods of time in which no transmission or reception of data is being performed by the long-range transmission system.

* * * * *